(Model.)

5 Sheets—Sheet 1.

J. P. MONROE.
Grain Binder.

No. 242,021.                    Patented May 24, 1881.

Witnesses:
F. H. Schott.
N. R. Brown

John P. Monroe
Inventor
C. H. Watson &c.
Per         Attorneys.

(Model.)

5 Sheets—Sheet 2.

J. P. MONROE.
Grain Binder.

No. 242,021. Patented May 24, 1881.

Witnesses:
F. H. Schott
A. R. Bonn

John P. Monroe
Inventor

C. H. Watson & Co.
Attorneys
Per (Model.)
J. P. MONROE.
Grain Binder.
No. 242,021.
5 Sheets—Sheet 3.
Patented May 24, 1881.
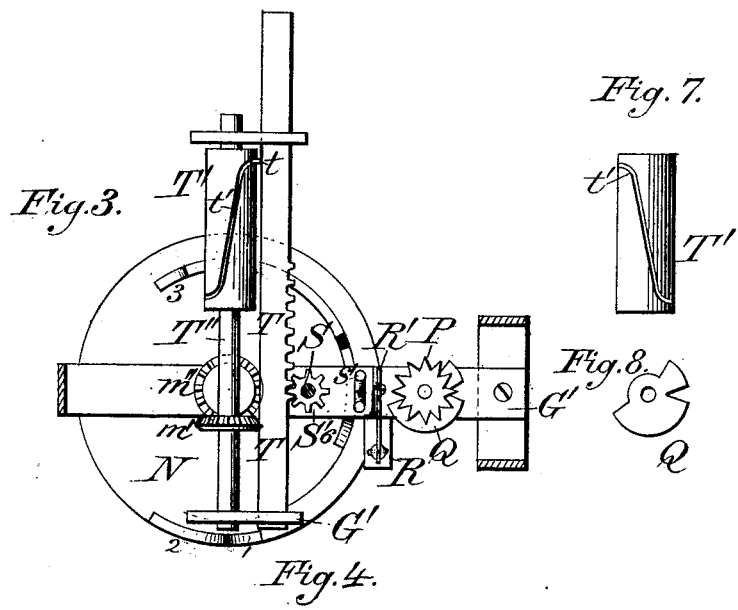
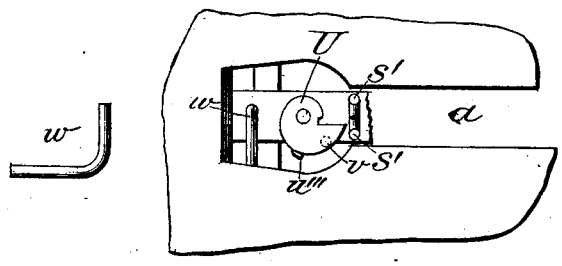
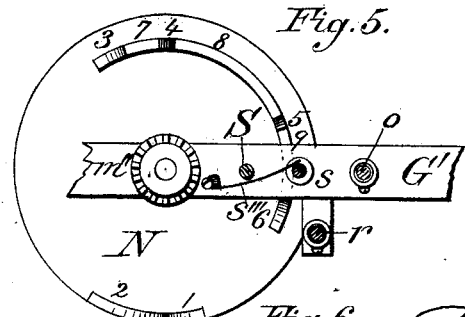
Witnesses:
John P. Monroe
Inventor
C. H. Watson & Co.
Attorneys.
Per 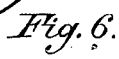

(Model.)  5 Sheets—Sheet 4.

J. P. MONROE.
Grain Binder.

No. 242,021.  Patented May 24, 1881.

Witnesses:
F. H. Schott.
N. R. Bovin.

Per

John P. Monroe
Inventor
C. H. Watson & Co.
Attorneys.

(Model.)

J. P. MONROE.
Grain Binder.

No. 242,021.    Patented May 24, 1881.

5 Sheets—Sheet 5.

Witnesses:
H. H. Schott.
A. R. Bown.

Inventor
John P. Monroe
C. H. Watson & Co
Per Attorneys.

UNITED STATES PATENT OFFICE.

JOHN P. MONROE, OF FRANKFORT, KENTUCKY, ASSIGNOR OF ONE-THIRD TO GEORGE FRANKLIN BERRY.

GRAIN-BINDER.

SPECIFICATION forming part of Letters Patent No. 242,021, dated May 24, 1881.

Application filed December 4, 1880. (Model.)

*To all whom it may concern:*

Be it known that I, JOHN P. MONROE, of Frankfort, in the county of Franklin and State of Kentucky, have invented certain new and useful Improvements in Machines for Binding Grain; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to grain-binding attachments for harvesters; and it consists in the construction and arrangement of devices whereby the grain is automatically made into bundles, which are carried to the tying mechanism while the binding-cord is being passed around them, and then delivered at the back of the machine after the twine has been tied and cut, as hereinafter more fully described and claimed.

Figure 1:
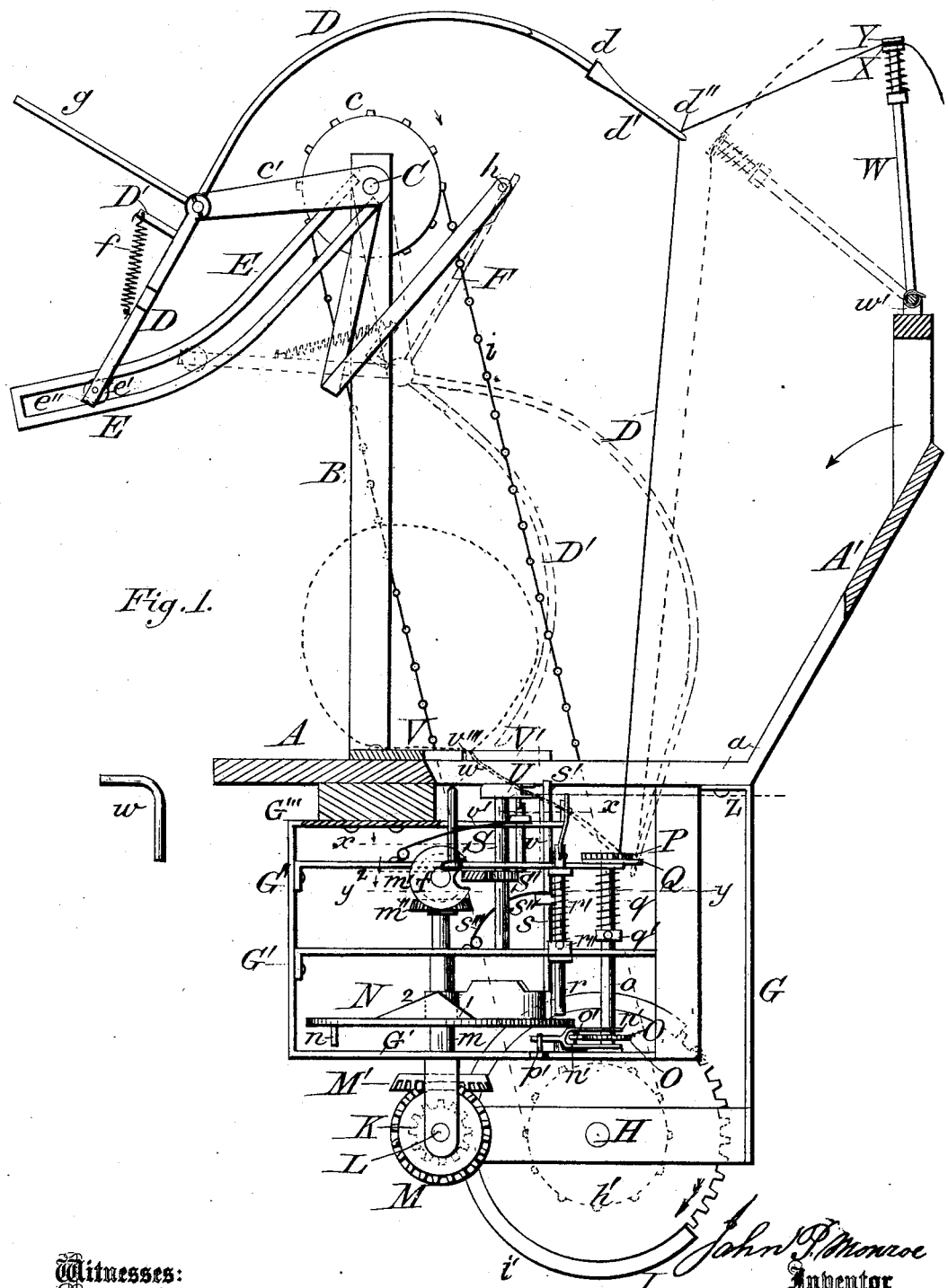
Figure 9:
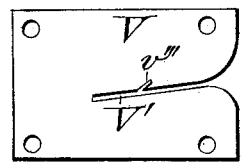
Figure 2:
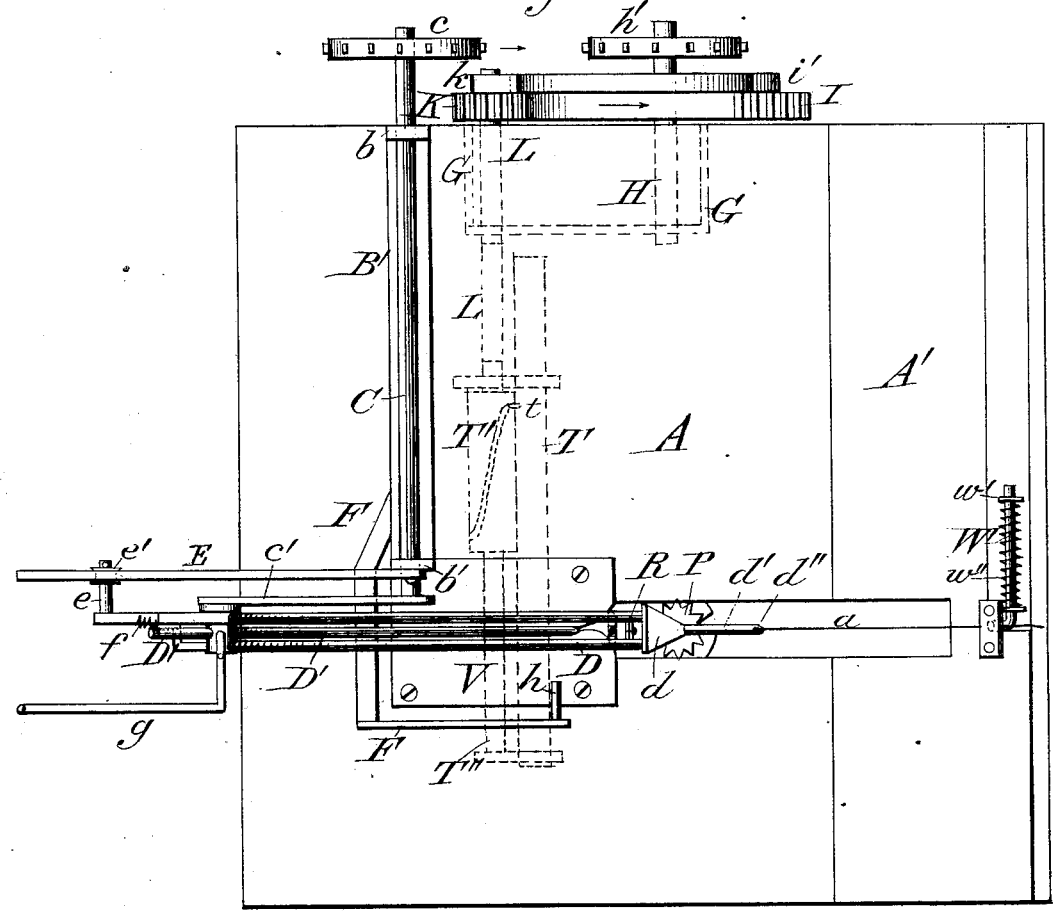
Figure 10:
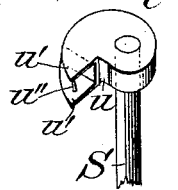
Figure 17:
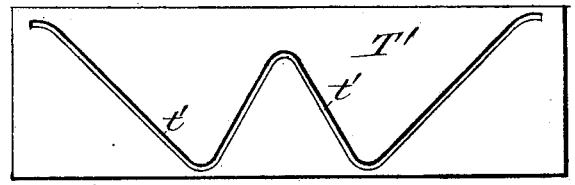
Figure 18:
Figure 19:
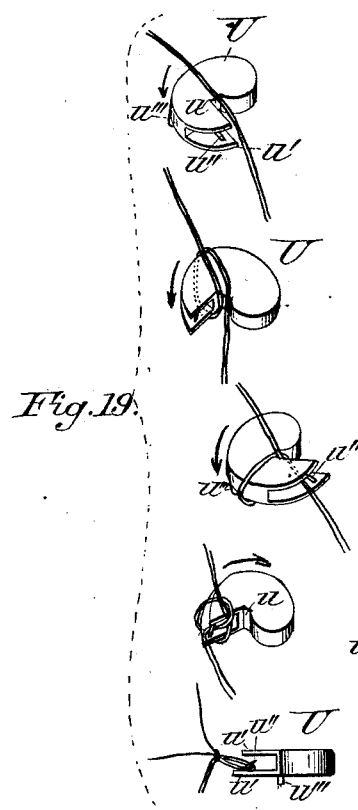
Figure 20:
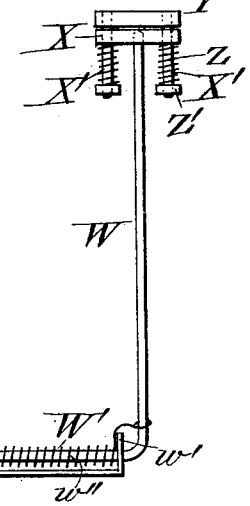
Figure 11:
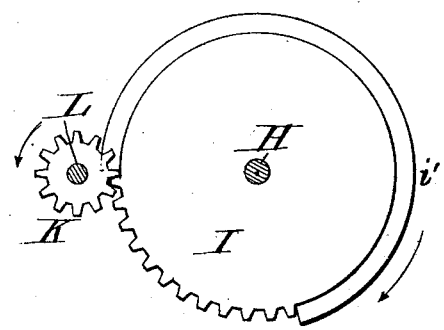
Figure 14:
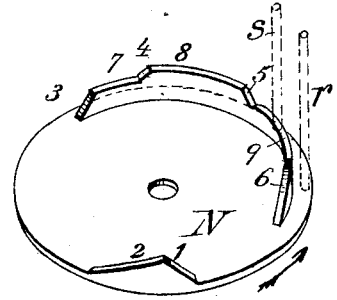
Figure 12:
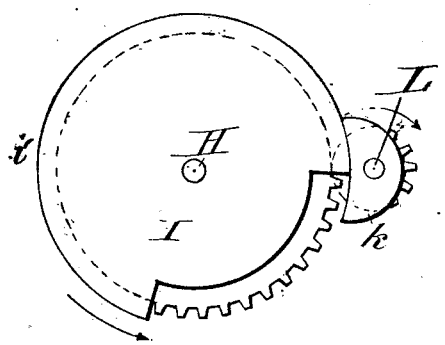
Figure 13:
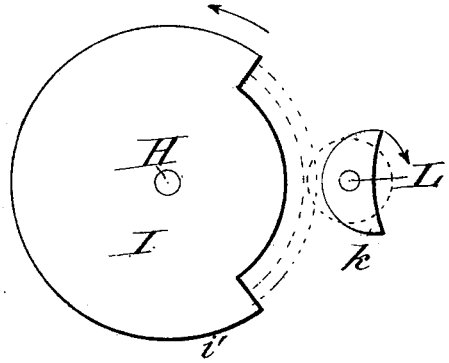
Figure 15:
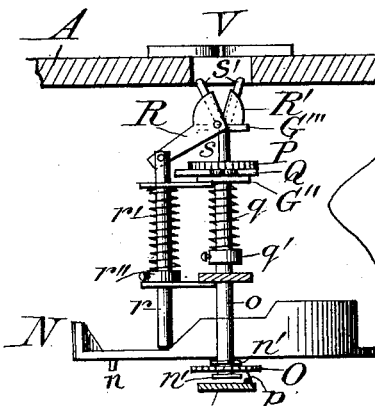
Figure 16:
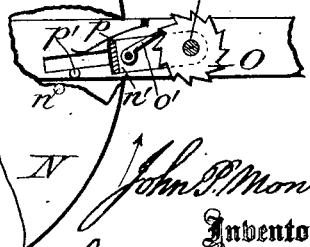

In the annexed drawings, in which similar parts are indicated by like letters in the several views, Figure 1 is a side view of my improved grain-binder. Fig. 2 is a plan view. Fig. 3 is a view of the tying mechanism, taken on the line $z\ z$, Fig. 1. Fig. 4 is a plan view of the same with the slotted covering-plate removed. Fig. 5 is a section taken on the line $y\ y$, Fig. 1. Fig. 6 is a section on the line $x\ x$ of Fig. 1. Fig. 7 is a bottom view of the grooved cam, the top view of same being shown in Fig. 3. Fig. 8 is a view of the holding-plate that is arranged under the spur-wheel, as shown in Fig. 3. Fig. 9 is a top view of the grooved covering-plate. Fig. 10 is a perspective view of the tying-hook. Figs. 11, 12, and 13 are detail views of gear-wheels. Fig. 14 is a perspective view of the crown cam-wheel. Fig. 15 is a front view, showing the manner of operating the shears. Fig. 16 is a plan view of the mechanism for operating the spur-wheel that holds the twine. Fig. 17 is a development of the cam-wheel shown in Figs. 3 and 7. Fig. 18 is a detail, showing views of the opposite sides of said cam-wheel. Fig. 19 shows successive steps in the manner of tying the knot, and Fig. 20 is a front view of the devices for regulating the tension of the twine.

A represents the binding-table, which is provided at its inner end with an incline, A′, over which the grain is received from the harvester. Through the center of the table and incline is formed a slot, $a$, for the passage of the binder-arms.

To the outer part of the table A, at one side, is secured a bracket composed of the vertical part B and upper horizontal piece, B′, the latter being provided at its ends with suitable bearings $b\ b'$ for the support of the crank-shaft C. This shaft is provided at one end with the chain-wheel $c$, and at its other end with the crank $c'$, to which are pivoted the curved binder-arms D D′.

The arm D is composed of two parallel rods, between which is pivoted the central arm, D′. These rods are connected at their outer ends by a cross-piece, $d$, which carries in its center an extension or twine-carrier, $d'$, provided near its end with an eye or aperture, $d''$, for the passage of the twine.

The heel-extension of the arm D is provided with a pin, $e$, carrying a grooved roller, $e'$, that works in a slot, $e''$, in a curved guide-bar, E, which is secured to the bearings $b'$.

The central arm, D′, is shorter than the double arm D, and is forked at its outer end, so as to catch readily over the cord and carry it into the slot in the plate V, as hereinafter described. Its pivoted end is provided with an arm projecting at right angles, which is connected to the heel-extension of the arm D by means of a coiled spring, $f$. The arm D′ is also provided at its pivoted end with a bent rod or guide-pin, $g$, that extends outward for a short distance and then upward until it comes in line with an inwardly-projecting stop-pin, $h$, on an extension or arm, F, that is attached to the horizontal portion B′ of the supporting-bracket.

To the under part of the table A, at one side, is secured a downward-projecting bracket, G, that supports the operating mechanism of the machine. This bracket affords bearings for the driving-shaft H, to the outer end of which is attached the chain-wheel $h'$, from which motion is communicated, by means of the chain $i$, to the chain-wheel $c$ on the shaft C, thus operating the crank $c'$ and curved binding-arms D D'. On the shaft H is a gear-wheel, I, the periphery of which is provided with cogs or teeth for about one-quarter of its face only. These teeth gear with the pinion K on the shaft L, thus revolving said shaft. The outer surface of the pinion K is provided with a delay-surface consisting of the segment or half-moon $k$, that acts at intervals in conjunction with the outer plain face or rim, $i'$, of the wheel I, as shown in Figs. 2, 12, and 13, to prevent the rotation of the shaft L when the pinion K is not in gear with the teeth on the wheel I, thereby maintaining the knot-tying mechanism stationary and in the proper position for receiving the cord.

The horizontal shaft L, near its opposite end, carries a miter-gear wheel, M, that engages with a similar wheel, M', on a vertical shaft, $m$, which is supported in suitable bearings G'.

The shaft $m$ carries a crown cam-wheel, N, which is provided on its under surface with a pin, $n$, which engages at each revolution of the cam-wheel with an arm or projection on the yoke $n'$. This yoke is provided at its opposite end with openings, through which passes loosely the vertical shaft $o$, which carries near its lower end a ratchet-wheel, $o$, which is arranged within the parallel arms of the yoke $n'$ and engages with a pawl, $o'$, secured to the same. After the pin $n$ on the lower surface of the cam-wheel has moved the pivoted yoke a sufficient distance to allow the pin $n$ to pass, the yoke is forced back by means of the spring $p$ until it again rests against a pin, $p'$. At each revolution of the cam-wheel N its pin $n$, by engaging with the yoke $n'$, causes the pawl $o'$ to push the ratchet-wheel O around about two teeth, thus causing the shaft $o$, to which the ratchet is secured, to make a partial revolution. The shaft $o$ carries at its upper end a spur-wheel, P, that works above a notched plate, Q, between which and the spur-wheel is held the twine for binding the grain, as shown in Fig. 1.

Around the shaft $o$ is coiled a spring, $q$, that has a bearing above against a part of the supporting-bracket G'', while its lower end bears against an adjustable collar, $q'$, on the shaft. This collar is provided with a set-screw, so arranged that the collar may be readily adjusted upon the shaft $o$, in order to give the proper pressure to the spur-wheel P against the plate Q, for the purpose of holding the twine securely under varying circumstances. The form of the plate Q is that of a segment of a circle having a V-shaped notch near one end of its front or circular side, as shown in Figs. 3, 8, and 15, for the purpose of guiding the twine between the teeth of the spur-wheel.

The wheel N is provided on the outer edge of its upper surface with a projecting cam having the double inclines 1 2 of unequal length, which engage at each revolution of the cam-wheel with the lower end of the rod $r$.

To the upper end of the rod $r$ is pivoted one end of an adjustable cutting-blade, R, the opposite end of which is pivoted to the bracket G''', to which is also securely fixed a stationary cutting-blade, R', the two blades acting together as shears to cut the twine at each revolution of the cam-wheel after the knot has been formed.

The rod $r$ is provided with an adjustable collar, $r''$, and spiral spring $r'$, which are arranged in a similar manner to that on the shaft $o$, for the purpose of restoring the rod $r$ and opening the blades of the shears after the twine has been cut.

On the upper surface of the cam-wheel N, opposite the double-inclined cam 1 2, and arranged on a circle within that on which said cam 1 2 is placed, is an irregular cam-projection, composed of the inclines 3, 4, 5, and 6 and the intermediate plane surfaces 7, 8, and 9. This irregular cam engages with the lower end of a rod, $s$, which is provided at its top with a V-shaped fork, $s'$, for holding the twine up while the tying-hook passes under it, as hereinafter more fully described. This rod $s$ is also provided with an adjustable collar, $s''$, to which is attached one end of a curved wire spring, $s'''$, the opposite end of which is coiled and secured to the bracket G'. By this means the lower end of the rod $s$ is kept in contact with the cam-wheel N, and at each revolution of the same is caused to rise and fall progressively over the inclines 3, 4, 5, and 6, and maintain an even motion at intervals over the intermediate plane surfaces 7, 8, and 9, thereby raising and lowering the twine to suit the movements of the tying-hook during the operation of tying the knot.

The knot-tying hook U is fixed to the top of a vertical shaft, S, which has its bearings in the brackets G' G'' G'''. On the shaft S is a cog-wheel, S', which gears with a sliding toothed rack, T, that is provided on the opposite side with a pin, $t$, which engages in the cam-groove $t'$ in a cylinder, T', arranged on a horizontal shaft, T'', that is driven from the vertical shaft $m$ by means of the miter-gears $m'$ $m''$.

The knot is tied by means of the hook U, (shown in Fig. 10.) This hook is securely fixed to the top of the shaft S, so as to rotate at each revolution of said shaft. The body of the hook comprises in its outlines a little more than three-fourths of a circle, its upper surface being slightly beveled at the edges. A vertical groove, $u$, is formed in one side of the solid portion of its body, and projecting outward from one side of this groove, at top and bottom, are the lips $u'$ $u'$, the lower lip being slightly larger than the upper one, and provided with an inwardly-inclined beveled tooth, $u''$.

A small pin, $u'''$, is secured to the under side of the hook on its outer edge and near the junction of the lower lip, $u'$, with the solid body, to keep the loop in the twine from slipping around the hook.

A short rod or pin, $v$, provided with a spring, $v'$, is arranged to move loosely up and down in suitable bearings near one side of the hook. This spring-actuated pin is designed to remove the knot, after it has been formed, from around the body of the hook, leaving it attached to the hook by the tooth $u''$ only, as shown in Fig. 19.

Back of the hook U is a short curved rod or pin, $w$, the end of which comes in contact with and pushes the knot from the tooth $u''$ when the tying-hook passes the said rod in its reverse movement.

A covering-plate, V, is placed over the enlarged outer end of the slot $a$ on the top of the table A. This plate serves to prevent the straw from falling down and becoming entangled with the tying mechanism. The plate V is provided with an inwardly-curved front edge, terminating in a central diagonal slot or opening, V', having on one side a short notch, $v'''$, that guides the twine and holds it in place while being tied.

Attached to the incline A' is a device for regulating the tension of the twine and taking up the slack. This device consists of a swinging rod, W, having a lower horizontal arm, W', that is pivoted in suitable lugs or bearings $w'$, and around which is coiled a spring, $w''$, one end of which is secured to the outer lug, $w'$, and the other end to the vertical rod.

At the upper end of the rod W is a stationary cross-piece, X, in the ends of which are openings for the passage of the screws X' X', that carry at their upper ends an adjustable cross-piece, Y. The screws X' X' are provided with coiled springs Z Z and nuts Z' Z', by means of which the upper cross-piece, Y, is adjusted to hold the twine, which passes between it and the lower cross-piece, with the requisite degree of pressure.

The operation of the machine is as follows: Motion, imparted to the driving-shaft H in any suitable manner, is transmitted by the chain-wheels $h'$ $c$ and chain $i$ to the shaft C and crank $c'$, thus throwing the curved arms D D' forward from the position shown in full lines in Fig. 1. In making this movement the grooved roller $e'$ on the pin $e$ passes upward in the slotted guide-bar E nearly to the top, when the arms fall forward and the roller $e'$ slips backward down the slot $e''$. As the arms fall forward the rod $g$ on the arm D' passes down over and in front of the pin $h$ on the extension F. After passing down about one-third its length, in front of the pin $h$, the rod $g$ comes in contact with the pin, thus causing the arm D' to disengage itself from the arm D, as shown in dotted lines in Fig. 1, until the end of the rod $g$ slips under the pin, when the arm D' is returned to its former position by the tension of the spring $f$. By this means the twine, passing from the tension and take-up device W through the eye $d''$ in the end of the arm D, and thence to the spur-wheel P, is passed over and around the bundle of grain at the same time that the bundle is carried backward by the binding-arms. When the arm D' is caused to separate from the arm D the latter carries the twine into the V-shaped notch in the front of the plate Q, which guides it between the teeth of the spur-wheel P. This wheel, being caused to move around slightly by the action of the pawl $o'$ and ratchet-wheel O at the lower end of the shaft $o$, pinches the twine between itself and the plate Q. While this is being done the arm D' carries the bundle back over the table A, at the same time carrying both parts of the twine into the slot V' in the covering plate V, whence it slips backward into the notch $v'''$, when the arm D' begins to ascend.

Owing to the relative position of the various parts of the knot-tying mechanism the twine, in passing from the spur-wheel P to the notch $v'''$, lies between the blades R R', through the fork $s'$ $s'$, and in the vertical groove $u$ in the side of the tying-hook. While the twine is in this position the knot is formed by the tying-hook U, which first makes a little more than one complete revolution on its axis, so as to wind the twine once around and then carry it between the lips $u'$ $u'$, over and back of the tooth $u''$, thus forming a loop which is prevented from slipping around the needle by means of the pin $u'''$.

The motion of the tying-hook is now reversed, so as to slip the loop off by passing it against the top of the spring-actuated rod $v$, which gives way slightly and leaves the loop held by the tooth $u''$ only. The reverse motion of the hook continues until it passes the curved rod $w$, when it again commences to make a revolution in the opposite direction, and as it now repasses the rod $w$ the latter comes in contact with and takes the tightened knot from the tooth $u''$. While the tying-hook is forming the knot the twine is moved up and down by means of the forked rod $s$, which is actuated by the cam on the wheel N, as before described, in order to accommodate the movements of the rod $s$ to those of the hook. After the knot is formed, and just before the loop is slipped from the hook, the twine is cut by means of the blades R R'.

It will be seen that the reverse movements of the hook U are caused by the reciprocating motion of the toothed-rack T, which engages with the cogs S' on the vertical shaft S, and with the cam-groove $t$ in the cylinder T' on the horizontal shaft T'', the latter being driven from the shaft $m$ by means of the miter-gearing M' M'', as before described.

Owing to the construction and arrangement of the gear-wheels I K an intermittent motion is imparted to the shaft L, which is transmitted, through the miter-gears M M', to the knot-tying mechanism, so as to cause the various parts of the same to perform their appropriate functions at proper intervals.

Having thus described my invention, what I claim as new, and desire to secure by Letters Patent, is—

1. The combination, with the cam-wheel N, having pin $n$, of the vertical shaft $o$, having ratchet-wheel O, yoke n', pawl o', and spur-wheel P, substantially as and for the purpose set forth.

2. The combination of the shaft o, spring q, adjustable collar q', spur-wheel P, ratchet-wheel O, notched plate Q, yoke n', pawl o', spring p, and pin p', substantially as and for the purpose described.

3. The combination, with the cam-wheel N, having the inclines 1 and 2, of the rod r, having spring r', and adjustable collar r'', pivoted cutting-blade R, and stationary cutting-blade R', substantially as specified.

4. The combination, with the cam-wheel N, having inclines 3, 4, 5, and 6, with intermediate plane surfaces, 7, 8, and 9, of the vertical forked rod s, substantially as and for the purpurpose described.

5. The combination of the shaft T'', having cam-grooved cylinder T', the reciprocating toothed rack T, having pin t, and the shaft S, having pinion S', and tying-hook U, substantially as specified.

6. The tying-hook U, having vertical side groove, u, lips u' u', beveled tooth u'', and stop-pin u''', substantially as set forth.

7. The combination, with the tying-hook U, having beveled tooth u''', of the curved rod w, substantially as and for the purpose specified.

8. The combination of the spur-wheel P, notched plate Q, shears R R', forks s' s', tying-hook U, spring-rod v, curved rod w, and slotted plate V, substantially as shown and described.

9. The tension and take-up device consisting of the rod W, having the horizontal arm W', provided with a coiled spring, w'', stationary cross-piece X, and adjustable cross-piece Y, substantially as set forth.

In testimony that I claim the foregoing as my own I have hereto affixed my signature in presence of two witnesses.

JOHN P. MONROE.

Witnesses:
A. R. BROWN,
CHARLES P. WEBSTER.